United States Patent
Kuhlenschmidt

[11] 3,750,416
[45] Aug. 7, 1973

[54] COOLING OF ABSORPTION REFRIGERATION SYSTEM

[75] Inventor: Donald Kuhlenschmidt, Evansville, Ind.

[73] Assignee: Arkla Industries, Inc., Evansville, Ind.

[22] Filed: Apr. 2, 1971

[21] Appl. No.: 130,660

[52] U.S. Cl............................ 62/101, 62/116, 62/485
[51] Int. Cl............................................. F25b 15/02
[58] Field of Search..................... 62/101, 116, 476, 62/483, 485

[56] References Cited
UNITED STATES PATENTS

| | | | |
|---|---|---|---|
| 3,440,832 | 4/1969 | Aronson | 62/476 X |
| 1,630,648 | 5/1927 | Wirth | 62/476 |
| 1,901,794 | 3/1933 | Altenkirch | 62/101 |

Primary Examiner—William F. O'Dea
Assistant Examiner—Peter D. Ferguson
Attorney—Cushman, Darby & Cushman

[57] ABSTRACT

The absorber in a salt solution absorption refrigeration machine is cooled by heat exchange with a stream of refrigerant liquid obtained from the evaporator. The refrigerant vaporizes in absorbing heat and the vapor then passes to an air-cooled condenser by means of an ejector device which employs hot refrigerant vapor flowing from the generator as the driving fluid.

6 Claims, 1 Drawing Figure

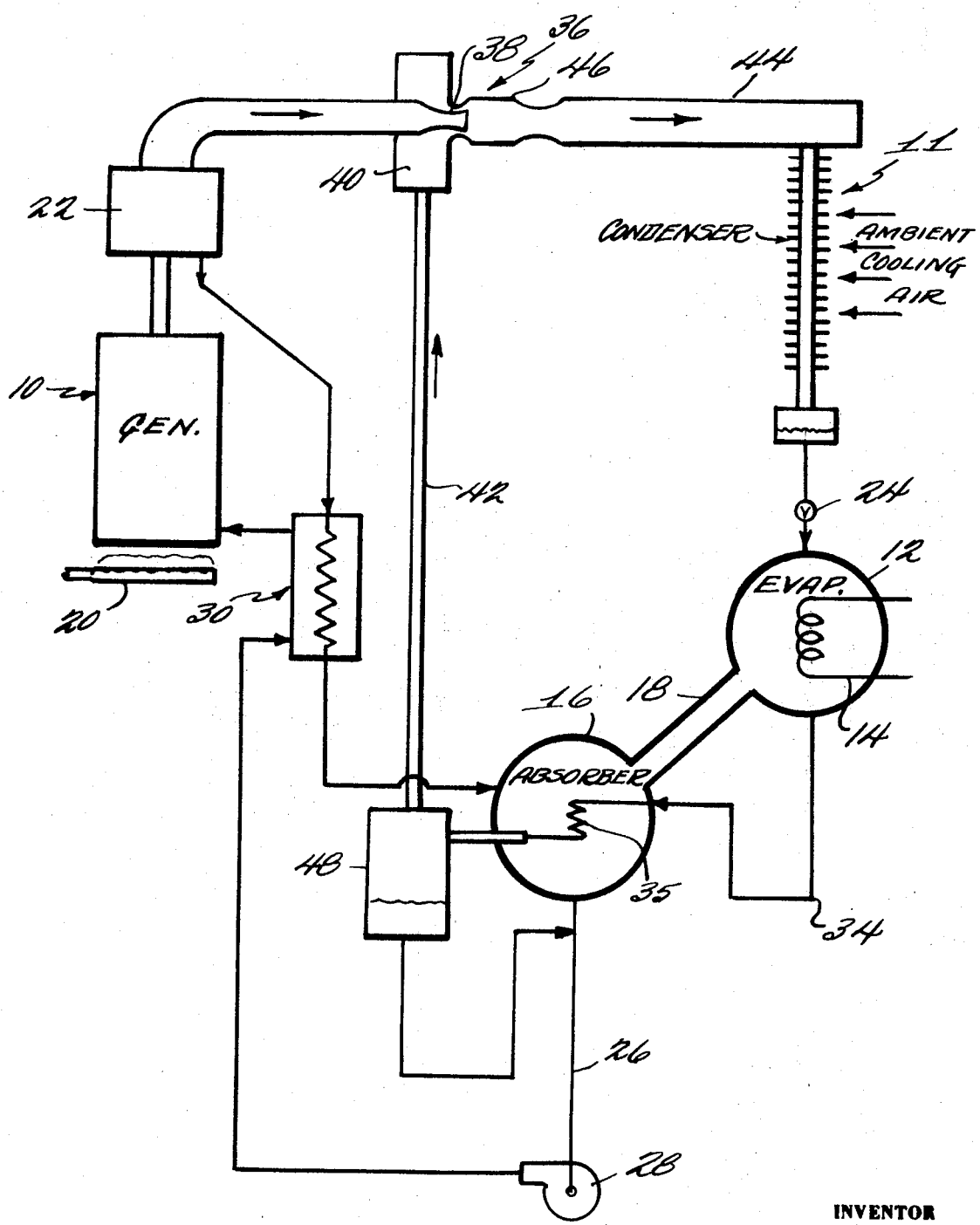

COOLING OF ABSORPTION REFRIGERATION SYSTEM

This invention relates to absorption refrigeration systems of the type in which a liquid refrigerant vaporizes to produce a cooling effect and is subsequently absorbed into a liquid absorbent solution. More in particular the invention relates to improvements in such systems which permit the systems to be cooled with a relatively warm cooling medium such as ambient air.

One recognized problem with absorption refrigeration machines utilizing an aqueous salt solution as the absorbent is that cooling of the absorber section with a relatively warm coolant such as ambient air is not generally successful. The principal reasons for this lack of success are (1) the vapor pressure of the salt solution at the elevated temperatures resulting from air cooling result in an evaporator temperature that is too high for satisfactory cooling and/or (2) the salt solution has such a high crystallization temperature that it tends to form crystals at ambient temperature when the machine is shut down. By crystallization temperature is meant the temperature at which solid crystals begin to form as the salt solution is cooled. The problem is discussed more in detail below with reference to a machine employing an aqueous lithium bromide solution as an illustrative example of a typical absorbent. The principles of the invention are not, however, limited to the use of a particular absorbent.

In absorption refrigeration systems of the type under consideration the absorber pressure, for a given solution concentration, varies with the absorber temperature. When heat is extracted from the absorber with a stream of coolant, the minimum practical absorber temperature obtainable is 10-20° F above coolant temperature, or about 115° F for 95° F ambient air. Therefore, if one wishes to operate a conventional air-cooled unit he must use an abosrbent solution which has a low enough vapor pressure at 115° F to create the required vaporization in the evaporator. As a practical matter, the evaporator should be capable of chilling a water stream to 45° F, and for this purpose the evaporator temperature should be no higher than approximately 42° F. The latter temperature is produced during vaporization of water at 6.7 mm Hg. Therefore, the solution leaving the absorber in a conventionally designed air-cooled system should have a vapor pressure no higher than 6.7 mm Hg at 115° F. From available vapor pressure data for lithium bromide it is found that a 59.2 weight percent solution satisfies this requirement. The concentration of the entering solution must, of course, be higher, and for an operating system, the entering concentration will be about 62.2 percent. Since the latter solution has a crystallization temperature of about 112° F, such a solution is impractical since it will crystallize when the unit is shut down. If a more dilute entering solution, e.g., a 59 percent solution, is employed in order to overcome the crystallization problem, then the leaving solution would have a concentration of about 56 percent and a vapor pressure of 9 mm Hg. At this pressure the evaporator would operate at 49.5° F, obviously impossible for obtaining 45° F chilled water.

In accordance with the principles of the present invention the absorber is cooled by heat exchange with a stream of vaporizing liquid refrigerant obtained from the evaporator. This vaporizing refrigerant is capable of cooling the absorber to a lower temperature than, for example, 95° F ambient air, and the result is that the absorber pressure and hence the evaporator pressure are lowered. The lower evaporator pressure produces a lower evaporator temperature, so that the overall result of the technique is the capability of the system to produce cooling at a lower temperature while utilizing a salt absorbent solution which in the conventional system would produce cooling only at a higher temperature. This means that the absorbent can be more dilute in salt content than the absorbent which would normally be employed. That is, referring to the illustrative concentration figures in the above example, the present invention makes possible, for example, the use of a 59 percent aqueous lithium bromide solution in an air-cooled unit producing 45° F water, whereas without the refrigerant cooling of the absorber this same solution would produce chilled water of 49.5° F or higher.

The refrigerant vapor produced in cooling the absorber during the cooling process must be continuously conducted away from the absorber for subsequent condensation. For this purpose the present invention provides a pumping means for passing the vapor from the heat exchanger associated with the absorber to a condenser, the pumping means conveniently being an ejector or aspirator device which can be operated with an already existing fluid stream as the driving fluid.

The invention will be further understood from the following detailed description of an illustrative embodiment taken with the sole figure which is a schematic illustration of a salt solution absorption refrigeration system embodying the principles of the present invention.

Referring to the drawing there is shown a single-effect aqueous salt solution absorption refrigeration unit having a refrigerant vapor generator 10, an ambient-air-cooled condenser 11, an evaporator 12, a chilled water coil 14 associated with the evaporator and an absorber 16 in communication with the evaporator through a conduit 18, all of which may be conventional components with the exception that the absorber 16 is cooled by boiling refrigerant. Refrigerant vapor is expelled from absorbent solution in the generator 10 by applying heat to the latter from a heat source, such as a gas burner 20. The expelled vapor separates from absorbent solution in a vapor separator 22 and passes to the condenser 11 where it is condensed by heat exchange with ambient air passing over the exterior of the condenser.

Refrigerant liquid passes from the condenser through an orifice 24 to the evaporator 12 where a part of the liquid is vaporized by absorbing heat from water passing through the chilled water coil 14. The refrigerant vapor thus produced passes to the absorber 16 where it is absorbed in absorbent liquid which is weak in refrigerant. The resulting liquid which is high in refrigerant content passes from the absorber 16 to the vapor generator 10 by way of a line 26, a solution pump 28, and a heat exchanger 30. After refrigerant vapor has been boiled off in the generator 10 the resulting concentrated salt solution, that is solution weak in refrigerant, returns to the absorber by way of a line 32 and the heat exchanger 30.

All of the above is conventional in structure and operation in certain known single-effect absorption refrigeration machines and has been presented in order to describe the environment of the present invention. The overall function of the system is, of course, to utilize the vaporizing refrigerant in the evaporator to produce chilled water in the coil 14 for any suitable purpose, such as conditioning air.

In accordance with the principles of the present invention the absorber 16 is cooled with excess refrigerant which is obtained in unvaporized form from the evaporator 12 and then vaporized in heat exchange relationship with the solution in the absorber 16. In the illustrated embodiment liquid refrigerant is conducted from the evaporator through a U-shaped liquid trap 34 and then through a coil 35 over the exterior of which flows the entering absorbent solution.

The heat liberated in the absorber 16 by the absorption process converts the liquid refrigerant to vapor. In order to remove this vapor there is provided a pumping means, such as an ejector device 36 or aspirator device or its equivalent, capable of conducting the vapor out of the coil 35 for eventual condensation. The ejector 36 or other venturi type of device is particularly suitable as the pumping means because it can utilize the stream of refrigerant vapor from the generator 10 as the driving or pumping fluid.

The ejector 36, which is illustrated schematically, may be of any suitable construction and as shown includes an ejector nozzle 38 of reduced cross section projecting into a suction chamber 40 which connects with the absorber 16 by way of a conduit 42. A conduit 44 having a diffuser section 46 connects the downstream part of the suction chamber 40 with the condenser 11.

The nozzle 38 converts the pressure head of the vapor flowing therethrough into a high velocity stream which passes into the diffuser section 46 lowering the pressure in the suction chamber, thereby entraining refrigerant vapor from the coil 35. The entrained vapor and the driving vapor from the generator 10 are conducted through the conduit 44 to the air-cooled condenser 11. A concentration chamber 48 may be provided in the conduit 42 at the refrigerant vapor outlet of the coil 35 to trap any excess liquid refrigerant.

The more specific operation of the system may be visualized by first assigning typical values to some of the operating variables. For purposes of illustration let it be assumed that the ambient air temperature is 95° F that the salt solution entering the absorber 16 is an aqueous lithium bromide containing 59 percent lithium bromide, this solution having a crystallization temperature of about 60° F. If the absorber 16 were cooled by heat exchange with ambient air, as in a conventional air-cooled system, the solution leaving the absorber 16 would have a temperature of about 115° F and a concentration of about 56 percent salt. At this temperature the solution would have a vapor pressure of about 9 mm Hg. As previously explained if the evaporator 12 were operated at 9 mm pressure, the vaporizing refrigerant would produce a temperature of 49.5° F, too high to produce the typically desired 45° F chilled water.

In the illustrated system, however, refrigerant liquid from within the system is employed to cool the absorber 16 to below the temperature obtainable with 95° F ambient air. Since, for a salt solution of a given concentration, the absorber pressure varies with the absorber temperature, the lower temperature effects a corresponding lower absorber pressure. This lower pressure also appears in the evaporator 12 with the result that the temperature of the refrigerant evaporating therein drops. If, for example, the refrigerant liquid entering the absorber 16 by way of the liquid trap 34 cools the 56 percent salt solution to 106° F, the absorber pressure and evaporator pressure will drop to 6.7 mm Hg which is the vapor pressure of that solution at 106° F. At this pressure the evaporator will operate at 42° F to produce 45° F chilled water. The overall result is, therefore, that the system has the ability to produce a desired low evaporator temperature while employing relatively high-temperature ambient air as the ultimate cooling medium and while employing a relatively low concentration salt solution which does not produce a sufficiently low evaporator temperature when conventional ambient air cooling of the absorber is employed.

What is claimed is:

1. In an absorption type refrigeration system having an evaporator for receiving a stream of liquid refrigerant and evaporating a portion thereof so that unvaporized refrigerant exists in the evaporator as excess liquid refrigerant, an absorber vessel for receiving refrigerant vapor from the evaporator and for absorbing the vapor into a liquid absorbent, generator means for expelling refrigerant vapor from the liquid absorbent, condensing means for condensing the expelled refrigerant vapor, the improvement comprising: conduit means connected to said evaporator for conducting the excess liquid refrigerant which collects in said evaporator into heat exchange relationship with said absorber to thereby cool the liquid absorbent and vaporize the liquid refrigerant; and pump and conduit means for conducting the vaporzied refrigerant away from said absorber.

2. A refrigeration system as in claim 1 wherein the conduit means for conducting liquid refrigerant from the evaporator to the absorber includes a U-shaped liquid trap.

3. A refrigeration system as in claim 1 wherein the evaporator is located at a higher elevation than the absorber and wherein the conduit means for conducting liquid refrigerant from the evaporator to the absorber includes a U-shaped liquid trap.

4. In a method of operating an absorption type refrigeration system in which refrigerant vapor is expelled from a solution of the refrigerant in a liquid absorbent by heating the solution, condensed by heat exchange with a coolant stream, partially evaporated in an evaporator vessel so that unvaporized refrigerant exists in the evaporator vessel as excess liquid refrigerant, and reabsorbed in the liquid absorbent in an absorber vessel which is in communication with the evaporator vessel, the improvement which comprises: cooling the absorbent in the absorber vessel by continuously conducting said excess liquid refrigerant directly from the evaporator vessel into heat exchange relationship with the absorbent in the absorbent vessel and thereby vaporize the liquid refrigerant whereby the temperature and hence the pressure in the latter are lowered and whereby the lowered pressure appears in the evaporator vessel; and subsequently condensing the resulting vaporized refrigerant by heat exchange with said coolant stream.

5. A method as in claim 4 wherein the vaporized refrigerant is conducted away from the absorber vessel and into heat exchange with the coolant stream by aspiration with a stream of the refrigerant vapor which is being expelled by heating a solution of refrigerant in a liquid absorbent.

6. A method as in claim 5 wherein said coolant stream is ambient air.

* * * * *